Sept. 28, 1926. 1,601,311
M. W. KOSKI
SAFETY GATE
Filed Nov. 16, 1922 2 Sheets-Sheet 1
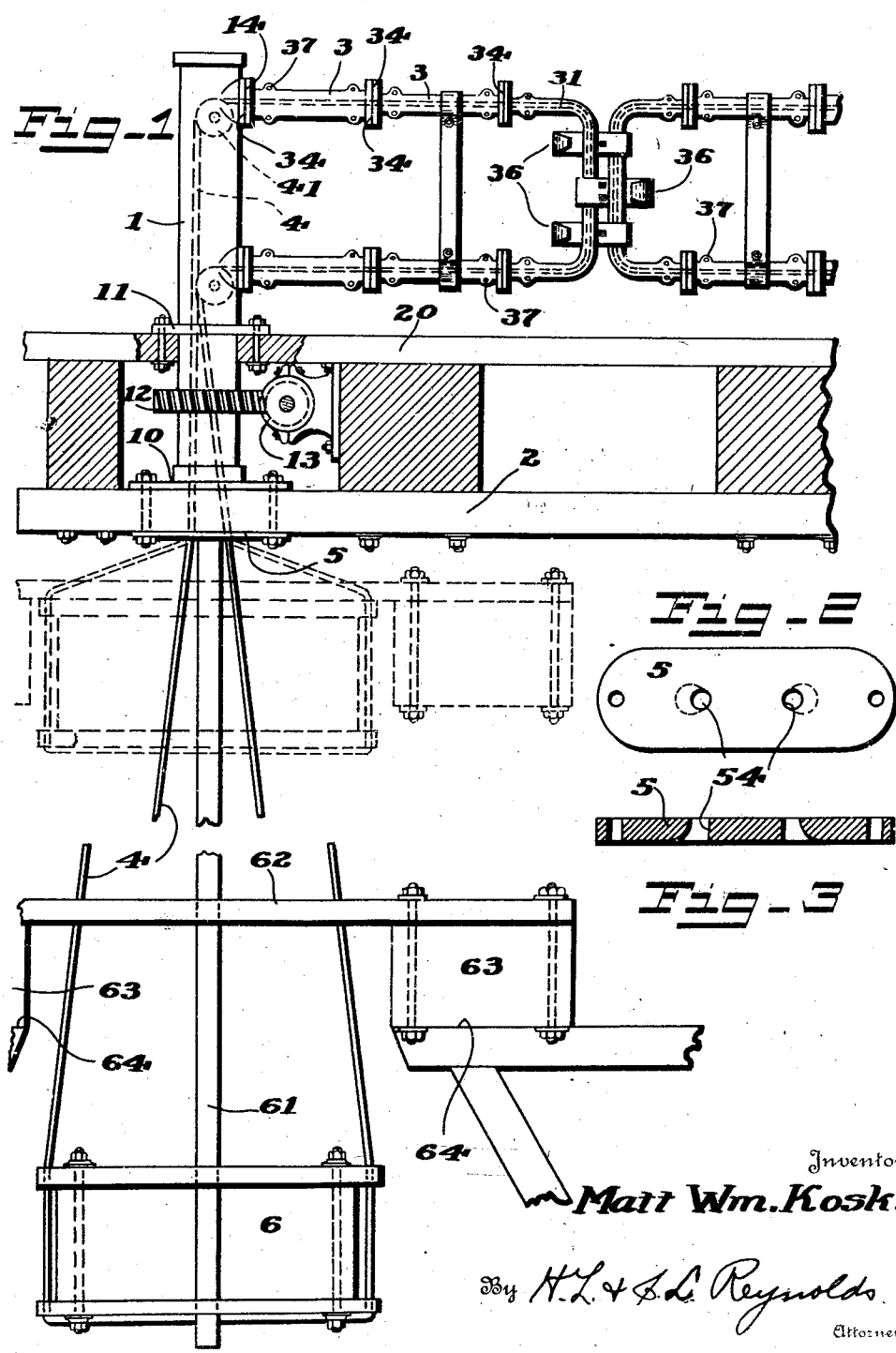

Sept. 28, 1926.  
M. W. KOSKI  
SAFETY GATE  
Filed Nov. 16, 1922  
1,601,311  
2 Sheets-Sheet 2
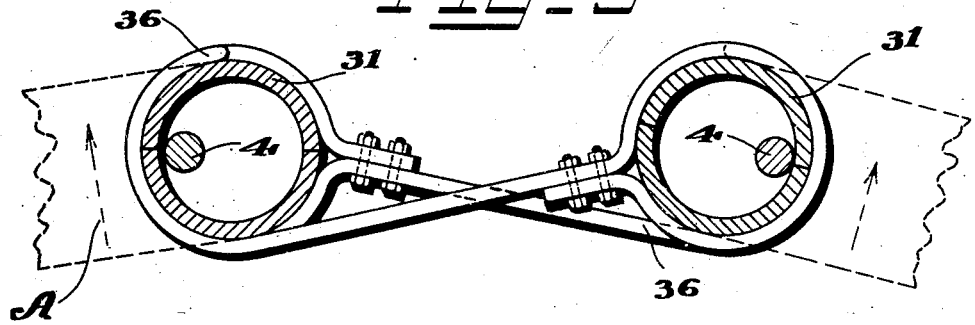
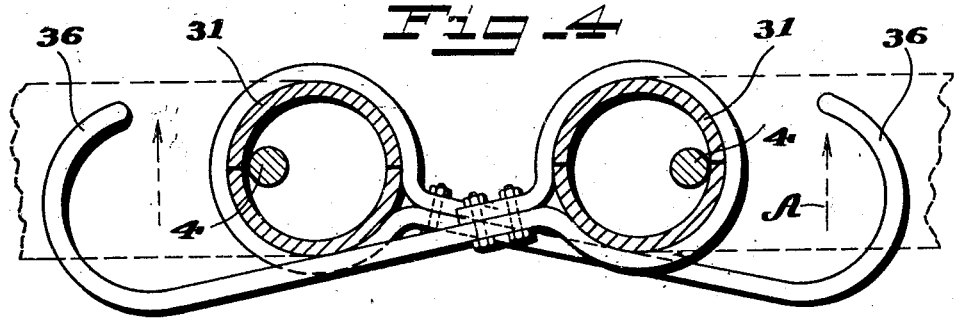
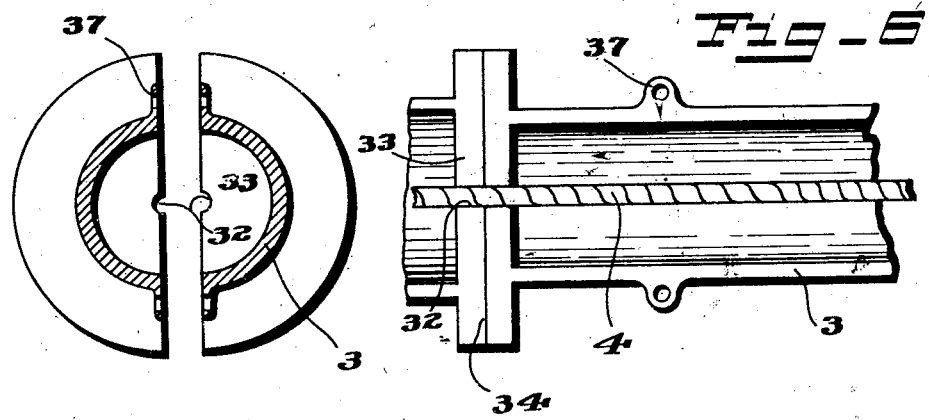
Inventor  
Matt Wm. Koski  
By H. L. & J. L. Reynolds  
Attorneys Patented Sept. 28, 1926.

1,601,311

UNITED STATES PATENT OFFICE.

MATT WILLIAM KOSKI, OF COSMOPOLIS, WASHINGTON.

SAFETY GATE.

Application filed November 16, 1922. Serial No. 601,289.

My invention relates to gates and principally to gates intended for use as safety gates upon highways, bridges, ferries, or like places.

It is an object of my invention to provide a safety gate which will be rigid in ordinary use, but which will be flexible, yet resistant, if struck by a moving object.

A further object is the provision of such a flexible safety gate which has means associated therewith for increasing the resistance of the gate under excessive strains to a greater extent than under ordinary strains.

A further object is the provision of a safety gate comprising two swinging halves, the halves having means which automatically interlock in a direction to resist unlocking by a force tending to flex the gates.

A further object is the provision of such a safety gate which may be easily repaired if broken.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is an elevation of my gate showing it employed in the form which is now preferred by me.

Figures 2 and 3 are, respectively, plan and section through a detail of this gate.

Figures 4 and 5 are sections through the swinging ends of the two halves of the gate, showing them respectively in nearly closed and in fully closed positions, and illustrating an automatic locking means.

Figure 6 is a longitudinal section through an end of a gate section.

Figure 7 is a transverse section through a gate section showing the halves thereof separated.

It is, of course, immaterial in what manner the gate is mounted, or how it is caused to swing. In the present illustration I have shown the gate as mounted upon a bridge approach to guard a draw. A post 1, preferably tubular, which forms the support for a half of the gate, is shown as mounted in thrust bearings 10 in a bridge approach structure 2. The post is also received in a bearing 11 on the deck 20 of the bridge approach. Any suitable arrangement may be provided for rotating the post to swing the gate which is attached thereto into or out of operative position. I have shown a worm pinion 13 in mesh therewith. The pinion 13 may be rotated by any suitable means.

Each half of the gate is alike and I shall therefore describe one half only. The gate is made up of a plurality of sections 3 extending in axial alinement laterally from the post 1 and having their ends abutting, but preferably not secured together, or if secured together, by light, easily frangible connections. The post is provided with one or more, preferably two, laterally facing seats 14, and the gate section 3 which is next to the post is provided with a flange at its end having a complemental seat 34. When the seat 34 is pressed against the seat 14 the section 3 is held thereby to project laterally from the post 1. Similar seats 34 are provided at each end of each section 3, these seats abutting and supporting the outer sections to project laterally from the next inner section. The outermost section of the gate is shown as formed as a return bend 31. This likewise has seats 34 which seat upon the seats carried by the flanges of the next inner sections 3. I have shown an upper and lower course of sections joined by the return bend section 31.

In order to press and to hold these sections together I employ a flexible member, such as the cable 4, which passes through the sections 3 and 31 and then into or beyond the tubular post 1, and which then has secured to its ends means for producing a stress in the cable 4 tending to draw the sections 3 and 31 towards the post 1. With respect to each section 3 or 31, this cable and tensioning means produces the effect of a cable secured to each section outwardly of its seat upon the section next inward therefrom. I have shown the cable as passing over pulleys 41 within the post 1 and thence downward through holes 54 in a plate 5 to a weight 6, to which the two ends of the cable are secured to support the weight. By this means the weight 6 causes a stress in the cable 4, and this is sufficient to keep the sections 3 and 31 of the gate pressed inwardly along their axes towards the post 1 and hence projected laterally therefrom, though they may not be positively connected one to the other.

In order to maintain the sections 3 and the section 31 in axial alinement their terminal flanges are extended inward as is best shown in Figures 6 and 7. The inward extensions 33 are provided with a small axial bore 32 which is of a size to receive only the cable 4. By this means, if for any reason one section 3 is displaced from its axial alinement with another section, the action of the cable 4, being under tension, will be to realine itself, and consequently the holes 32 in the flanges 33, and this will cause realinement of the gate sections 3 automatically.

The gate sections are preferably formed of two semi-tubular halves connected by bolts 37. It will be seen that if one section is damaged by a collision or otherwise, the two halves thereof may be separated while keeping the sections inwardly and outwardly thereof separated, and a new section may be placed about the cable 4. In this manner repairs may be effected easily and without disassembling the entire gate.

The vertical portion of each terminal section 31 is provided with hooks positioned to engage the like portion of the opposite terminal sections, that is, the portion secured upon the other half of the gate. I have shown these hooks at 36. Certain of these hooks 36 are secured on one half of the gate, and others preferably upon the opposite half. They are positioned at such an angle (as is best shown in Figures 4 and 5) that they do not engage the opposite gate half when the gates are in a common plane, but when moved past a common plane in the direction shown by the arrows A in Figures 4 and 5, they will automatically engage and will resist any pressure from the direction from which they moved, tending to separate the gate halves. This would be the side from which a vehicle would approach in attempting to pass the safety gate. These hooks then make of the two halves of the gate a flexible tension member, the two cables 4 being connected through these hooks 36 to interpose the resistance of the weight 6 to any attempt by an external force to distort the gate halves. If an automobile out of control should strike the gate at any point it would yield, and yet the resistance of the weight 6 acting through the cables 4 would check the automobile and eventually stop it.

I have provided means for producing an added resistance to unusually severe shocks. The ends of the cable 4 are secured to the weight 6 as has been stated, this depending below the bridge structure 2. It is guided upon a vertical guide rod 61, and between the bridge structure 2 and the normal position of the weight 6 is positioned a yoke 62 carrying weights 63. The guide rod 61 passes through the yoke 62 so that if the weight 6 is raised sufficiently it will engage the yoke 62, and thereafter the strain on the cable 4 will be increased by the added weights 63.

To prevent the weights 6 and 63 from striking the bridge structure 2, and also to add additional resistance under excessive shocks, the holes 54 in the plate 5 through which the cable 4 passes have been peculiarly formed and positioned. They are positioned to conform somewhat to the normal spread of the two ends of the cable 4 with the gate in its normal position, that is, not distorted. The ends of the cable at the weight 6 are spread beyond this compass. It will be clear, then, that as the weight 6 is raised the cable will bear upon the outer portions of the holes 54. These have, therefore, been curved as is best shown in Figure 3, and by their friction upon the cable act as snubbers for the cable as it rises. Further, the cable when it rises to the dotted line position of Figure 1, is spread so that it will not pass farther through the holes 54. This limits the upward movement of the weights at a distance below the bridge structure 2 depending upon the amount of spread of the lower ends of the cable. This then acts as a snubber and shock absorber to gradually, and finally fully, check the upward movement of the weights 6 and 63, to the end that they may not damage the bridge structure itself. As the gate sections move back to their normal position after being distorted, the weights 6 and 63 are lowered, and at the proper time the weights 63 are deposited upon their normal support 64 and the weight 6 continues on downwardly alone.

What I claim as my invention is:

1. In a gate, in combination, a post, lateral gate members projecting therefrom to form a U-shape but not positively connected thereto, a cable having its central portion passed through said gate members and both its ends extending beyond the post, and means for placing a tensional stress upon both ends of said cable.

2. In a gate, in combination, a post, an upper and a lower pulley secured thereon, an upper and a lower seat facing laterally upon said post, tubular gate sections having seats complemental to said seats upon the posts, said seats being adapted to abut each against its complemental seat, and the sections to project laterally from the post, a cable having its central portion passed through said gate sections and its ends passing over said pulleys and downward through the post, and a weight secured to the lower ends of said cable.

3. In a sectional gate, two tubular members axially alined and having their adjoining ends abutting, a tensioned cable passing through said members and operable to press their abutting ends together, and complemental guides engaging and closely embracing said cable and formed in adjacent planes at the abutting ends of said tubular members.

4. In a sectional gate, two tubular members axially alined and having their adjoining ends abutting, flanges formed on the abutting ends and extending both within and without the confines of the sections' ends in planes normal to the axis of said sections, a cable under tension passing through said tubular members, said flanges thereon having axially alined holes of a size corresponding to said cable, and said cable being operable to press together the abutting ends of the tubular members.

5. In a sectional gate, a plurality of tubular sections axially alined and having their adjoining ends abutting, each section being longitudinally divided, means for securing together the parts forming a section, complemental seats formed on the abutting ends of said sections, and a tensioned cable passing through said members and operable to press them together.

6. A safety gate comprising two gates hinged to swing upon vertical axes towards each other, a hook upon the end of a gate opening forwardly and inclined rearwardly from the plane of its supporting gate, said hook extending to engage the swinging end of the opposite gate of the pair when the gates have swung past a common plane.

7. In a gate, a post having two laterally facing seats thereon, a plurality of sections comprising laterally projecting axially alined tubes each having its end seating upon said seats upon the post or upon the end of the next inner section, a terminal return section seating upon and connecting the ends of the outermost sections, a cable passing through all of said sections, and depending from the post, and a weight secured to the ends of said cable.

8. A flexible structure, a cable under tension connected thereto to maintain the gate normally rigid, both ends of said cable passing downward through holes enlarged at their under sides, and curved outwardly, and a weight secured to the ends of said cable to tension it, the ends of the cable below said holes being spread beyond their outer limits, and in the direction of their curvature.

Signed at Cosmopolis, Grays Harbor County, Washington, this 8th day of November 1922.

MATT WILLIAM KOSKI.